United States Patent [19]

Davis

[11] Patent Number: 4,767,537
[45] Date of Patent: Aug. 30, 1988

[54] DEWATERING OF SLUDGE USING NITRATE

[75] Inventor: H. Forbes Davis, Tallevast, Fla.

[73] Assignee: DAVCO, Thomasville, Ga.

[21] Appl. No.: 31,662

[22] Filed: Mar. 30, 1987

[51] Int. Cl.⁴ .............................................. C02F 3/28
[52] U.S. Cl. .................................... 210/608; 210/609; 210/610; 210/631
[58] Field of Search ............... 210/608, 609, 631, 610, 210/613, 614, 903

[56] References Cited

U.S. PATENT DOCUMENTS

| 3,464,919 | 9/1964 | Barta et al. | 210/608 |
| 4,587,019 | 5/1986 | Wolinski | 210/608 |

FOREIGN PATENT DOCUMENTS 56-38197 4/1981 Japan.

OTHER PUBLICATIONS

Dialog Abstract of European Patent Publication No. 87129.
Dialog Abstract of Japanese Patent Publication No. 57-984793.
Dialog Abstract of Japanese Patent Publication No. 59-010557.

Primary Examiner—Tom Wyse
Attorney, Agent, or Firm—Nixon & Vanderhye

[57] ABSTRACT

Process and apparatus for thickening or dewatering treated sludge in one or more thickening tanks includes the addition of nitrate ions to treated sludge as a mechanism for generating microscopic bubbles of nitrogen gas which adhere to, or are trapped by, sludge floc particles, causing a reduction in density of the particles which, in turn, causes the particles to float to the top of the thickening tank. The process separates the sludge into an upper thickened layer and a lower free water, or subnate, layer. Subnate is removed from the tank through a plurality of outlets arranged at different depths within the tank. The subnate outlets are shut off sequentially, from the highest to the lowest, as the level in the tank drops. Thereafer, the thickened sludge is removed from the bottom of the tank and pumped to a sludge disposal location. A portion of the thickened sludge may be recirculated to insure flow uniformity.

7 Claims, 2 Drawing Sheets

DEWATERING OF SLUDGE USING NITRATE

BACKGROUND AND SUMMARY OF THE INVENTION

This invention relates to a process and apparatus for thickening or dewatering of sludges produced from biological domestic or industrial waste water treatment processes. Sludge produced from biological treatment processes normally contains from 95 to 99.5% water. By reducing the water content, the volume and weight of the sludge will be reduced so that the cost of ultimate sludge disposal will be significantly decreased.

Currently, mechanical and mechanical/chemical processes exist for thickening biological sludges. These processes utilize belt presses, frame presses, belt thickeners, and dissolved air floatation for reducing the water content in the sludges. Almost all of these processes incorporate the addition of ionic polymers to aid in the coagulation of the sludge solid floc particles. The solids content of the thickened sludges leaving these processes varies from 30% to 4% depending upon the specific means of operation. In most cases, the higher the solids content of the thickened sludge, the greater the associated processing cost.

The concept of this invention is very similar to the theory associated with dissolved air flotation processes, the primary difference having to do with the mechanisms by which the solid sludge particles are floated. In this invention, nitrate ions ($NO_3-$) are added to sludge supplied from an aerobic or anaerobic treatment process. The flotation mechanism in this invention is based on the adherence of microscopic bubbles of nitrogen gas to sludge floc particles. More specifically, under anaerobic conditions, the facultative bacteria which are commonly present in waste water sludges will utilize the nitrate molecule as a source of oxygen. As the bacteria utilize the oxygen from the nitrate molecules, they release microscopic sized bubbles of nitrogen gas. The bubbles of nitrogen adhere or are trapped by the sludge floc particles, causing a reduction in density of the sludge floc, thereby causing the sludge floc particles to float. It is to be understood that with this process, no additional air or other gas need be dissolved under pressure in the liquid sludge.

As is apparent from the above description, the flotation process according to this invention is dependent upon the release of nitrogen gas. The reduction of the nitrate to nitrogen is a biological reaction, and therefore the rate of release of nitrogen is relatively slow. Accordingly, the flotation process in accordance with this invention requires approximately 16–24 hours of quiescence to maximize the sludge solids content.

In an exemplary embodiment of this invention, raw sludge is initially treated in a digester tank and thereafter pumped to at least a pair of sludge thickening tanks. At a point intermediate the digester tank and sludge thickening tanks, a dosage of nitrate is added to the sludge. Any source of nitrate ($NO_3-$) ions in a concentration of about 20 to about 80 mg of $NO_3$ per liter (depending on sludge characteristics) will be effective. A solution of sodium nitrate ($NaNO_3$) has been found to work well, although any water soluble salt may be used. The thickened sludge, with nitrate added, is maintained in the sludge thickening tanks for approximately 16 to 24 hours. During this period of time, as previously described, bacteria will utilize the oxygen associated with the nitrate molecules and will release fine bubbles of nitrogen gas. The nitrogen gas will adhere to the sludge floc particles and cause the solids to float to the surface. This will enable the residual free water, or subnate, to be removed from underneath the floated solids, by pump or by gravity, resulting in a higher sludge solids concentration.

The subnate should be drawn off at a relatively slow rate to avoid disruption of the solid float layer. The suction or draw-off piping for the subnate must also be adjustable in the sense that it can be maintained in the free water or subnate zone. This is important because, as subnate is removed, the solid float layer within the tanks drops. To this end, subnate removal piping is provided in each of the sludge thickening tanks, such that subnate outlets are arranged vertically at different levels within the tanks. Subnate may initially be removed simultaneously from each of the outlets. As the level of the combined sludge and subnate falls within the tank, the higher subnate outlets may be shut off sequentially. Control of the subnate outlets may be governed by the quality of the subnate. For example, when the subnate deteriorates to a suspended solids content greater than 200 mg/liter, the subnating process is discontinued at that level. Conventional means may be employed to monitor the quality of the subnate at levels generally corresponding to the subnate outlets.

Once all of the subnate is removed, the thickened sludge can then be pumped from the bottom of the sludge thickening tanks and thereafter pumped to, for example, tank trucks which will carry the thickened sludge to a disposal location away from the site.

In order to maintain continuity of flow, it may be desirable to recirculate a portion of the thickened sludge back to the sludge thickening tanks.

After the tanks have been emptied, or substantially emptied depending on the extent of recirculation, a new batch of nitrate-treated sludge may be pumped into the tanks and the process repeated.

Other objects and advantages of the invention will become apparent upon inspection of the drawings and the detailed description of the invention which follows.

DETAILED DESCRIPTION OF THE INVENTION

Figure 1:
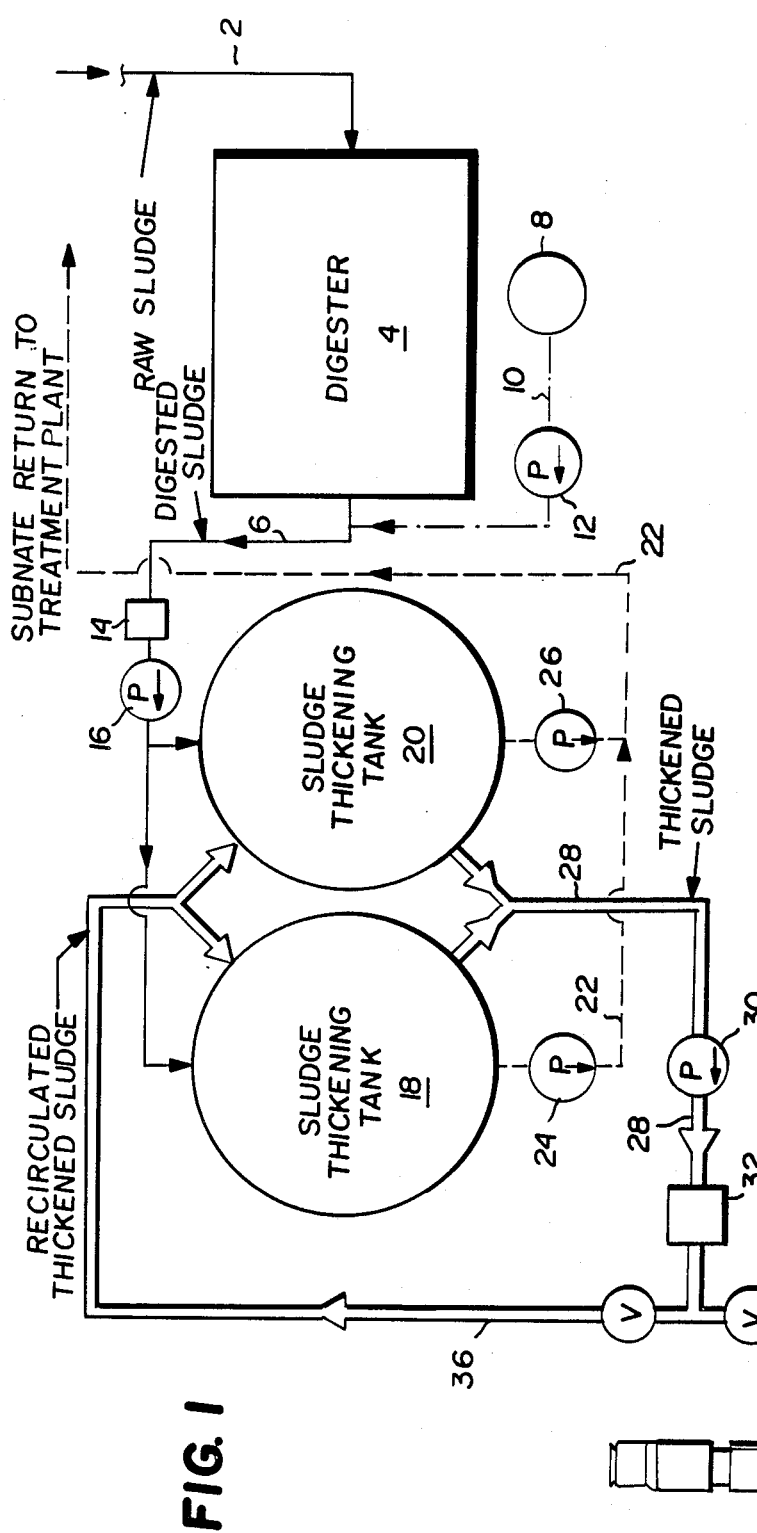
FIG. 1 is an overall schematic diagram of the nitrogen sludge flotation process and apparatus according to this invention.

With reference to FIG. 1, a broad, overall description of the nitrogen sludge flotation process and apparatus in accordance with this invention will be provided. Initially, raw sludge in a conduit or pipe 2 is fed from a source (not shown) to a digester tank 4. The digester tank itself and the treatment process which occurs therein are conventional and need not be further described herein. Digested sludge leaves the digester 4 by way of conduit or pipe 6. A suitable nitrate solution from a storage tank 8 is added to the sludge via conduit 10 with the assistance of a feed pump 12.

One effective nitrate solution is sodium nitrate ($NaNO_3$), although any source of $NO_3^-$ ions will suffice. Dosage is preferably from about 20 to about 80 mg. of $NO_3$ per liter of sludge. The digested sludge and sodium nitrate solution, with the assistance of fill pump 16, is fed simultaneously into a pair of sludge thickening tanks 18, 20. It will be appreciated that the utilization of thickening, or flotation, tanks is particularly suitable because the relatively slow reaction rate in the flotation process lends itself to batch or semi-batch processing. The number of sludge thickening tanks is not necessarily critical, but merely depends on the amount of sludge being processed, the transport capability of the sludge removal system, etc.

After a period of about 16–24 hours of quiescence, during which time sludge floc particles float to the top of the tank in a manner previously described, the free water or subnate is removed from the tanks 18, 20 through a conduit 22 with the assistance of subnate pumps 24, 26 which return the subnate to a treatment plant for further processing. After the subnate has been removed, in a manner to be described in detail hereinbelow, thickened sludge is removed from tanks 18, 20 through a conduit 28 with the assistance of a loading-/recirculating pump 30. A meter 32 may be provided to monitor the flow of thickened sludge to the transport or removal means, such as tank truck 34. In order to maintain uniform flow of thickened sludge throughout the process, a portion of the sludge may be recirculated via conduit 36 back into the sludge thickening tanks 18, 20.

Figure 2:
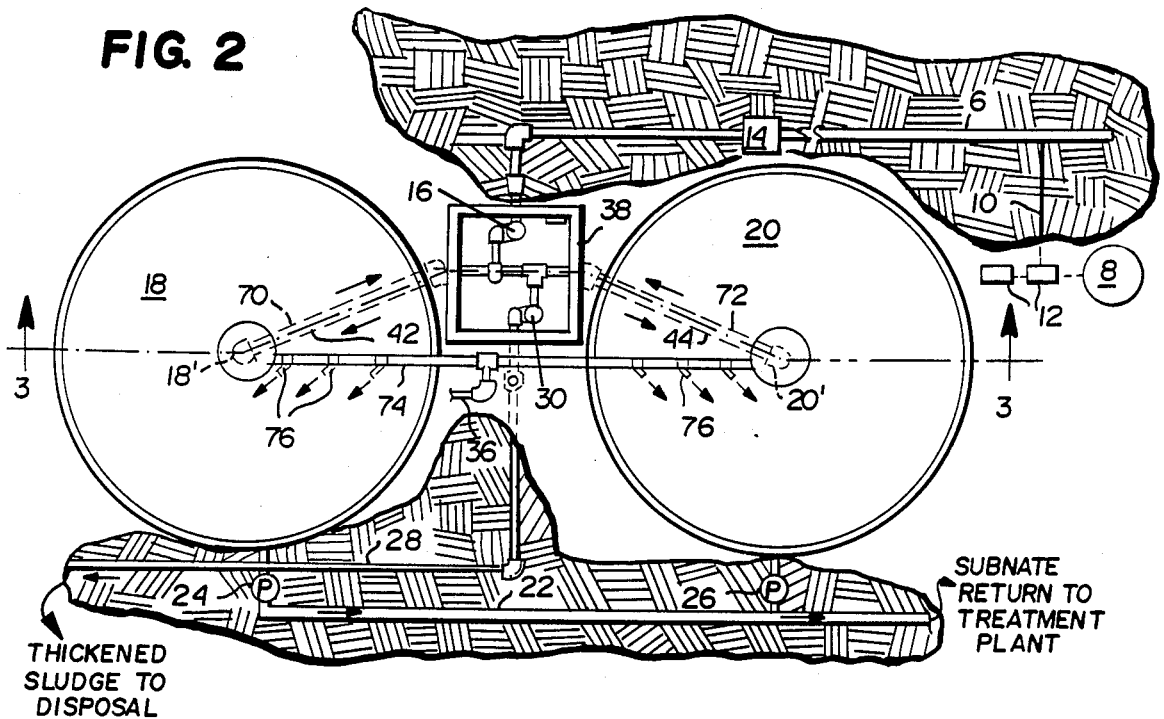
FIG. 2 is a plan view of a pair of sludge thickening tanks and associated piping in accordance with an exemplary embodiment of this invention.
Figure 3:
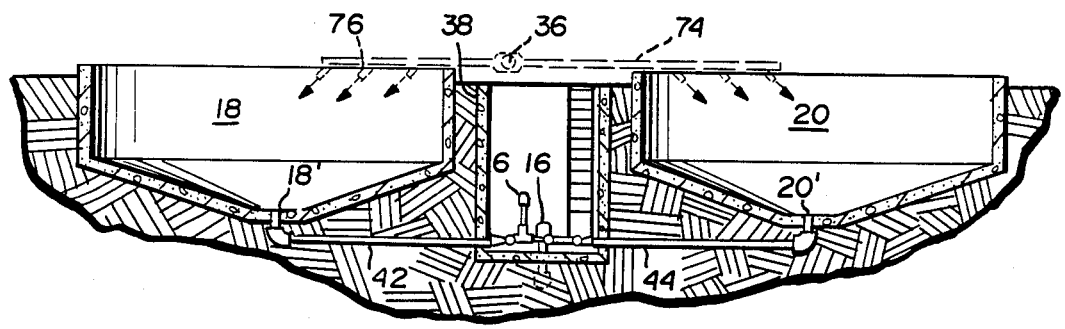
FIG. 3 is a sectional view taken along the line 3—3 of FIG. 2.

Turning to FIGS. 2 and 3, there are illustrated partially schematic, plan and sectional views, respectively, of the thickening tanks 18, 20 and associated piping. As previously described, nitrate solution from a storage tank 8 is fed via conduit 10 through one or more feed pumps 12 and injected into a digested sludge line 6. After flowing through a sludge meter 14, the thickened sludge is carried through conduit 6 into a below ground pump and valve chamber 38. The pump and valve chamber contains the sludge fill pump 16 which pumps the sludge through introduction lines 42, 44 and into tanks 18, 20, respectively, through inlets 18', 20' provided in the bottom walls thereof.

Figure 5B:
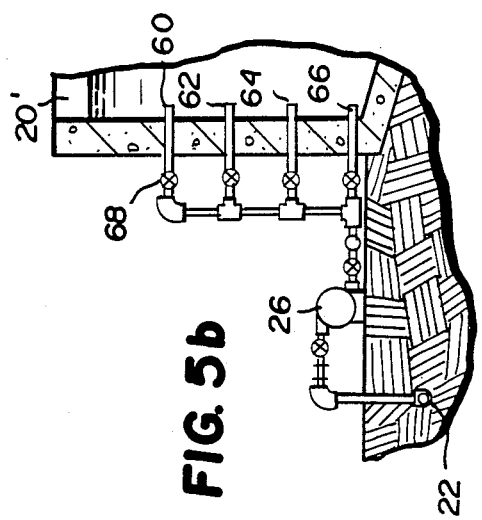
FIGS. 5a and 5b illustrate a subnate return system for an above grade tank in accordance with an alternative embodiment of this invention.
Figure 5A:
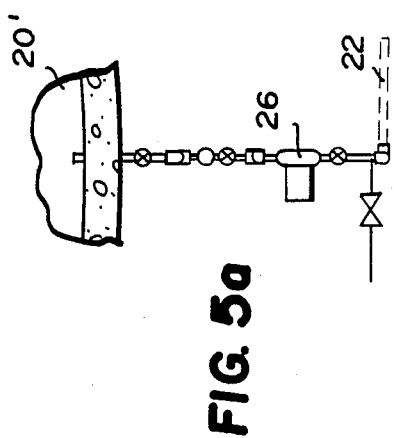
Figures 4A, 4B, 4C:
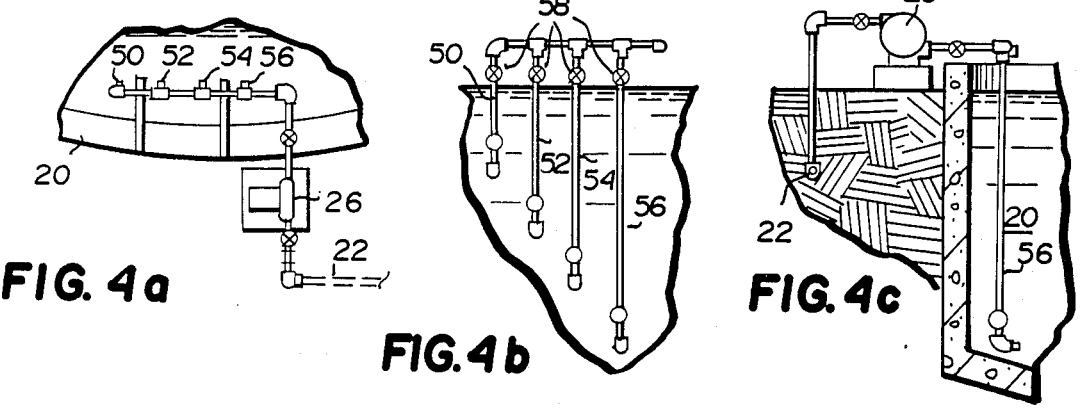
FIGS. 4a–4c illustrate subnate return piping for a below grade tank in accordance with one embodiment of this invention.

A subnate removal and return system is illustrated in FIGS. 4 and 5. FIGS. 4a b and c illustrate a return system for below grade tanks wherein suction pipes 50, 52, 54 and 56 are configured to terminate at different levels vertically within the tank 20. Subnate is initially removed from all of these lines simultaneously. During the course of subnate removal, the overall level of sludge/subnate in the tanks drops. The quality of the subnate at each of the suction pipe inlets may be monitored by any conventional liquid density measurement devices. When the solids content of the subnate deteriorates to, for example, 200 mg per liter at the inlet to pipe 50, a valve 58 associated with the pipe is closed, leaving suction pipes 52, 54 and 56 open and functioning to remove subnate from the tank. As the overall level in the tank drops still further, suction lines 52, 54 and 56 will be shut off sequentially as the quality of the subnate deteriorates at the respective levels in the manner described above.

In FIG. 5, an alternative subnate return system is illustrated for an above grade tank 20'. In this embodiment, as may be seen best in FIG. 5b, subnate suction pipes 60, 62, 64 and 66 are vertically oriented along the tank wall and lead to the subnate pump 26 which returns the subnate to the plant head works for further treatment. The operation of this embodiment is similar to that disclosed in conjunction with FIG. 4, i.e., suction pipes 60, 62, 64 and 66 are sequentially shut off by a respective shut-off valve 68 as the overall level of subnate and thickened sludge drops within the tank during the removal of subnate.

Referring back now to FIGS. 2 and 3, once the subnate has been removed from the tanks 18, 20, thickened sludge is sucked from the tanks through suction lines 70, 72 by pump 30 and pumped through conduit 28 to a disposal point which, in this case, is shown as constituting a tank truck 34. It will be appreciated that any other suitable disposal arrangement may be employed. As previously noted, a portion of the thickened sludge may be recirculated via conduit 36 to a sludge recirculation header 74 provided with a plurality of nozzles 76 which are arranged to extend across the top of each of the tanks 18, 20. By recirculating a portion of the thickened sludge, continuity of flow is assured during the process. It will be appreciated, for example, that during tank truck changeover, all of the thickened sludge can be recirculated while, at other times, it may be desirable to recirculate only a small portion thereof. As a further example, as the thickening tanks approach an empty condition, some of the thickened sludge may be recirculated while a new batch of nitrate-treated sludge is fed into the tanks from the digester.

From the above, it will be appreciated that a sludge thickening process in accordance with this invention includes the following steps:

(a) feeding raw sludge to a digester;

(b) adding nitrate ions to the sludge after the sludge exits the digester;

(c) feeding the digested sludge with nitrate ions to one or more sludge thickening tanks;

(d) maintaining the sludge in the one or more thickening tanks, without dissolving gas under pressure in the sludge, for a time sufficient to permit bacteria present in the sludge to react with nitrate ions so as to produce nitrogen gas bubbles which adhere to sludge floc particles to reduce the bulk density thereof, and thereby cause the sludge floc particles to float and form a thickened layer of sludge at top of the one or more thickening tanks;

(e) removing free water or subnate from the one or more thickening tanks; and (f) removing thickened sludge from the said at least one tank.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A process for increasing the solids content of sludge produced from biological treatment of domestic or industrial waste water without, at any time, dissolving air under pressure in the sludge, comprising the steps of:

(a) feeding raw sludge to a digester;

(b) adding nitrate ions to the sludge after the sludge exit the digester;

(c) feeding the digested sludge with nitrate ions to at least one sludge thickening tank;

(d) maintaining the sludge in said at least one thickening tank for a time sufficient to permit bacteria present in the sludge to react with said nitrate ions so as to produce nitrogen gas bubbles which adhere to sludge floc particles to reduce the bulk density therof, and thereby cause the sludge floc particles to float and form a thickened layer of sludge at top of said at least one thickening tank;

(e) removing free water or subnate from said at least one thickening tank; and (f) removing thickened sludge from the said at least one tank.

2. A process as defined in claim 1 wherein step (b) is carried out by adding a water soluble nitrate salt solution to the sludge.

3. A process as defined in claim 2 wherein said salt solution is sodium nitrate.

4. A process as defined in claim 1 wherein step (e) is carried out by utilizing a tank provided with subnate outlets arranged vertically at different levels and, by withdrawing subnate from said outlets, causing the overall level of sludge and subnate in said at least one tank to drop, and by shutting off said outlets, sequentially from higher to lower levels as said thickened layer of sludge approaches said outlets.

5. A process as defined in claim 4 wherein step (e) is further carried out by shutting off each subnate oulet when said subnate at that outlet has a suspended solids content greater than about 200 mg/L.

6. A process as defined in claim 1 wherein step (f), the thickened sludge is removed from the bottom of said at least one tank.

7. A process as defined in claim 1 wherein step (b) is practiced by adding between about 20-80 mg $NO_3$ per liter of sludge.

* * * * *